US008150089B2

(12) United States Patent
Segawa et al.

(10) Patent No.: US 8,150,089 B2
(45) Date of Patent: Apr. 3, 2012

(54) WIRELESS MICROPHONE AND APPARATUS FOR FIXING TRANSMITTER OF THE WIRELESS MICROPHONE

(75) Inventors: Yoshio Segawa, Kanagawa (JP); Fujio Nemoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 1147 days.

(21) Appl. No.: 11/607,946

(22) Filed: Dec. 4, 2006

(65) Prior Publication Data

US 2007/0147631 A1 Jun. 28, 2007

(30) Foreign Application Priority Data

Dec. 28, 2005 (JP) ................................ P2005-379436

(51) Int. Cl.
*H04R 9/08* (2006.01)
*H04M 1/00* (2006.01)

(52) U.S. Cl. ........................................ 381/364; 379/445

(58) Field of Classification Search .................. 381/361, 381/355, 79; 379/441, 445, 446, 447, 450
See application file for complete search history.

(56) References Cited

U.S. PATENT DOCUMENTS 4,215,431 A * 7/1980 Nady .............................. 455/43
4,819,846 A * 4/1989 Hannemann .................. 224/240
5,012,335 A * 4/1991 Cohodar ....................... 348/158
5,938,137 A * 8/1999 Poulson ..................... 242/379.2
6,182,878 B1 * 2/2001 Racca ........................... 224/605
6,776,318 B2 * 8/2004 Washington .................. 224/251
7,011,241 B2 * 3/2006 Godshaw et al. ............. 224/674

FOREIGN PATENT DOCUMENTS

JP SHP 40-16884 6/1965
JP SHO 57-60446 4/1982
JP HEI 02-26520 2/1990
JP HEI 06-11067 2/1994
JP 3099671 9/1996
JP 3077024 11/1998
JP 11068585 A * 3/1999
JP HEI 11-68585 3/1999
JP 2003-319480 11/2003
JP 2005-101776 4/2005

OTHER PUBLICATIONS

Office Action dated Oct. 18, 2010, issued by Japanese Patent Office, in Japanese Patent Application No. 2005-379436 (2 pages) with translation ( 2 pages).

* cited by examiner

*Primary Examiner* — Curtis Kuntz
*Assistant Examiner* — Sunita Joshi
(74) *Attorney, Agent, or Firm* — Finnegan, Henderson, Farabow, Garrett & Dunner, L.L.P.

(57) ABSTRACT

A wireless microphone is provided. The wireless microphone includes: a transmitter wirelessly transmitting audio signals converted from sound collected with a microphone unit; and a receiver receiving said audio signals. A clip is provided on one surface of the transmitter in which the microphone unit is attached to the other surface thereof; and the transmitter is capable of being mounted on a plane using the clip.

18 Claims, 9 Drawing Sheets

WIRELESS MICROPHONE AND APPARATUS FOR FIXING TRANSMITTER OF THE WIRELESS MICROPHONE

CROSS REFERENCES TO RELATED APPLICATIONS

The present invention contains subject manner related to Japanese Patent Application JP 2005-379436 filed in the Japanese Patent Office on Dec. 28, 2005, the entire contents of which being incorporated herein by reference.

BACKGROUND OF THE INVENTION

1. Field of the Invention

The present invention relates to a wireless microphone suitably applied to an imaging apparatus such as a camcorder, and an apparatus for fixing a transmitter of the wireless microphone.

2. Description of the Related Art

In general, a camcorder such as a digital camcorder captures object images and records object sounds. The camcorder includes, for example, a 4-channel microphone unit incorporated in a camcorder body to record sounds of the object collected with the microphone unit.

Japanese Patent Application Publication No. 2003-319480 discloses a device in which a position of a microphone can be selected freely to be fixed.

SUMMARY OF THE INVENTION

A camcorder that records object sounds collected with a microphone unit incorporated in a camcorder body of the related art may capture images of an object away from the camcorder by 10 m to 30 m, for example. However, the camcorder may not clearly record the sounds of this object.

In view of the above, it is desirable to clearly record sounds of an object being comparatively away from the camcorder.

A wireless microphone according to an embodiment of the present invention includes: a transmitter wirelessly transmitting audio signals converted from sounds collected with a microphone unit, and a receiver receiving the audio signals. A clip is provided on one surface of the transmitter with the microphone unit being attached on the other surface thereof, and the transmitter is capable of being mounted on a plane using the clip.

An apparatus for fixing a transmitter of a wireless microphone according to an embodiment of the present invention includes: a transmitter wirelessly transmitting audio signals converted from sounds collected with a microphone unit, and a receiver receiving the audio signals. A clip is provided on one surface of the transmitter with the microphone unit being attached on the other surface thereof; the transmitter is capable of being mounted on a plane using the clip; and the transmitter is attached to a clip attached portion of a fixing belt using the clip.

In the case where a transmitter provided in an embodiment of the present invention is attached to an object or is mounted in the vicinity thereof and a receiver is attached to a camcorder, sounds of the object relatively away from the camcorder can be recorded clearly.

DESCRIPTION OF THE PREFERRED EMBODIMENTS

A wireless microphone and an apparatus for fixing a transmitter of the wireless microphone according to embodiments of the present invention are hereinafter explained with reference to the drawings.

Figure 1:
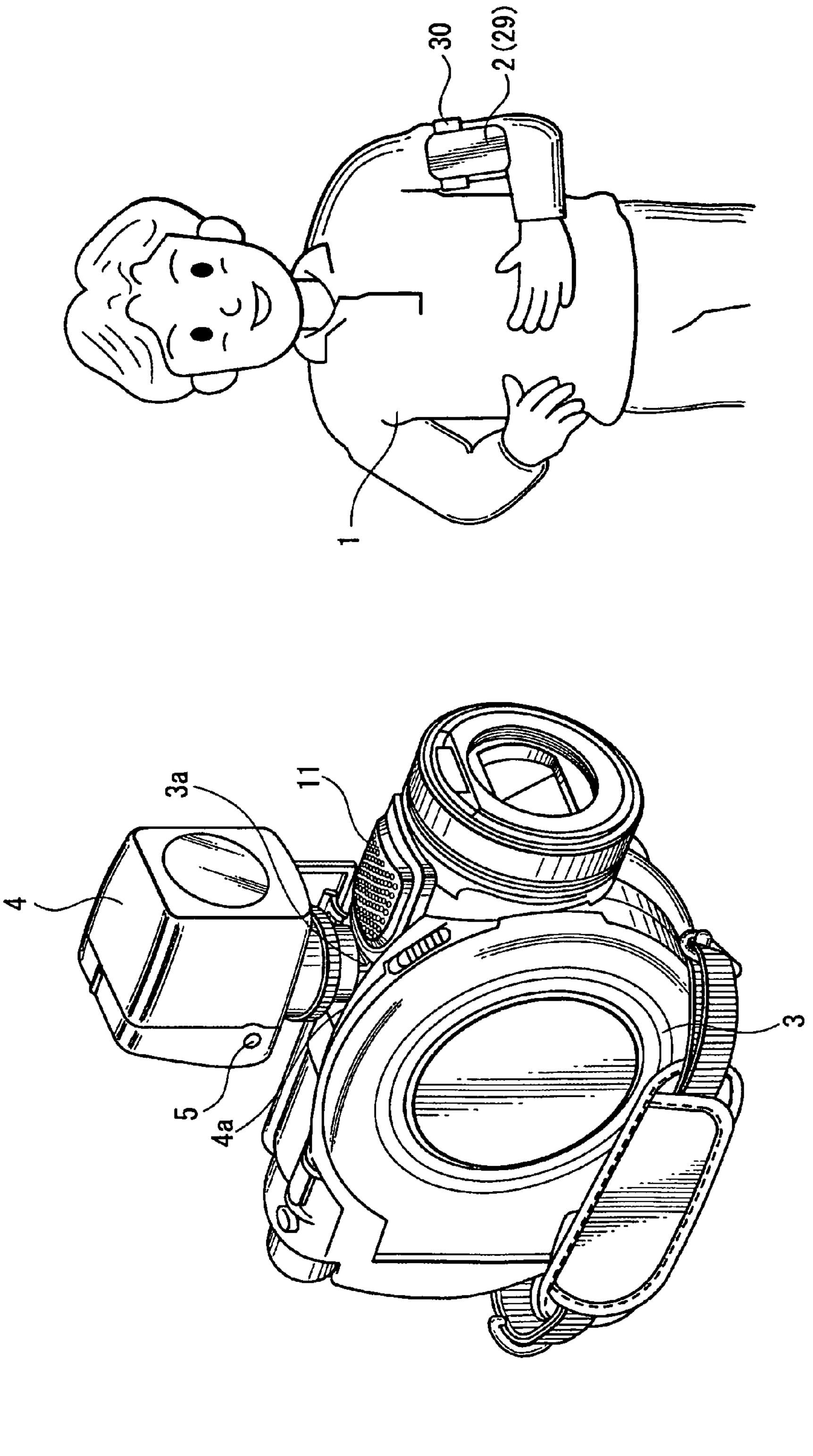
FIG. 1 is an appearance diagram showing a wireless microphone according to an embodiment of the present invention.

FIG. 1 is an appearance view showing a wireless microphone according to an embodiment of the present invention as a whole. The wireless microphone according to the embodiment includes a transmitter 2 and a receiver 4. The transmitter 2 is attached to, for example, an arm of a person who is an object 1 using a fixing belt 30 described later on, converting sounds collected with a microphone unit provided on the front surface into audio signals, and wirelessly transmitting the audio signals. The receiver 4 is attached to, for example, a terminal-included accessory shoe 3*a* in a camcorder 3, receiving the audio signals. In this case, with the receiver 4 being attached to the terminal-included accessory shoe 3*a*, an angle of directivity of an antenna in the receiver 4 corresponds with a direction of a light axis of the camcorder 3. Thus, a direction when capturing images of the object 1 corresponds with a direction of the angle of directivity of the antenna in the receiver 4 without fail and excellent communication can be carried out between the transmitter and receiver.

In order to wirelessly transmit audio signals from the transmitter 2, A2DP (Advanced Audio Distribution Profile) in Bluetooth® wireless technology is used in this embodiment. The A2DP is capable of transmitting high quality audio data and is resistant to radio disturbance, enabling radio-communication to be performed within the range of about 30 meters.

A shoe connector 4*a* corresponding to the terminal-included accessory shoe 3*a* in the camcorder 3 is provided to the receiver 4. The terminal-included accessory shoe 3*a* and the shoe connector 4*a* have power supply terminals, audio signal terminals and the like, and are capable of transmitting/receiving signals between the body of the camcorder 3 and the receiver 4.

An earphone terminal 5, to which an earphone is connected, is provided to the receiver 4 so that a photographer can listen to audio signals from the transmitter 2.

Further, the receiver 4 includes a switch for selecting a mode among ON mode, OFF mode and 5.1-channel mode. When the OFF mode is selected, audio signals transmitted from the transmitter are not recorded.

Figure 2:
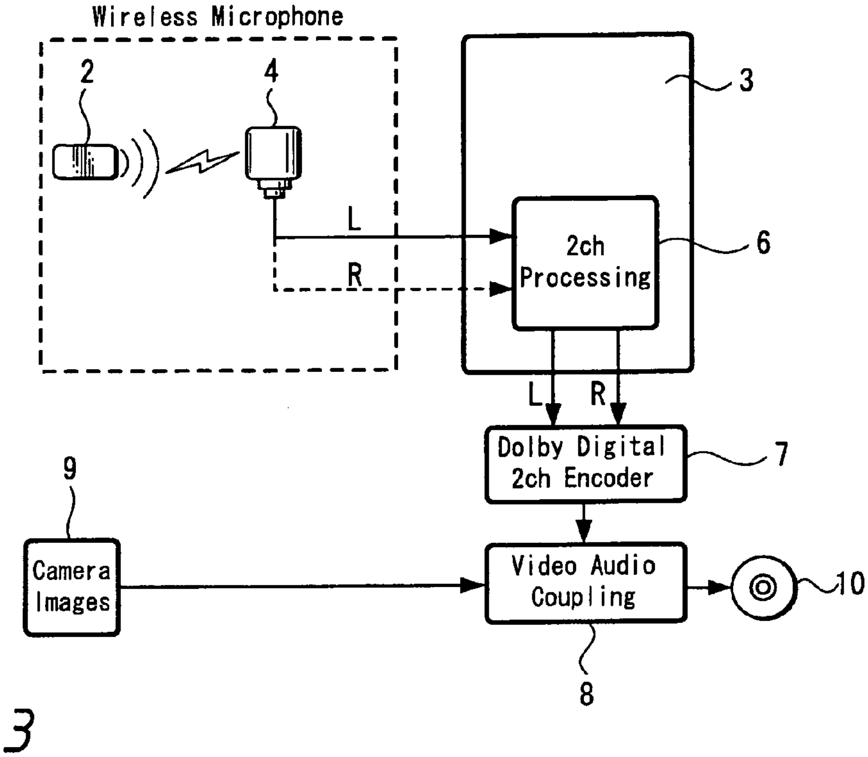
FIG. 2 is a configuration diagram provided for explaining a relevant part in FIG. 1.

As shown in FIG. 2, audio signals transmitted from the transmitter 2 are received by the receiver 4 when the ON mode is selected, and 2-channel signals are formed in the receiver 4 to be supplied to a Dolby Digital 2-channel encoder 7 through a 2-channel processing circuit 6 in the camcorder 3. The signals output from the Dolby Digital 2-channel encoder 7 are supplied to a coupling circuit 8 that couples video signals and audio signals.

Further, video signals from a camera 9 are supplied to the coupling circuit 8, and the signals output from the coupling circuit 8 are recorded into a DVD (Digital Video Disc) 10.

Figure 3:
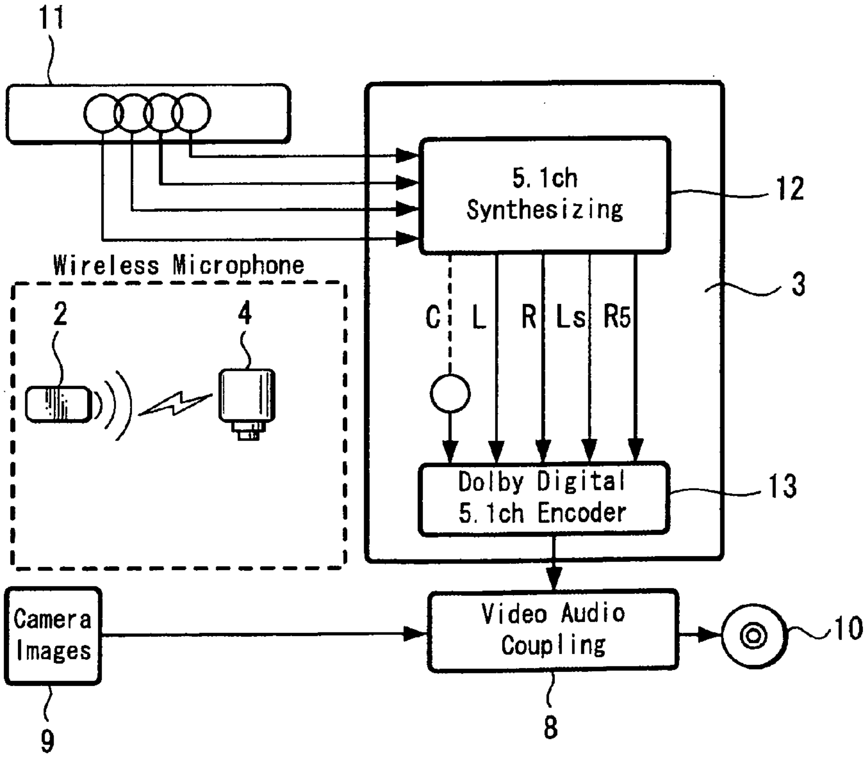
FIG. 3 is a configuration diagram provided for explaining a relevant part in FIG. 1.

Further, as shown in FIG. 3, in the case of the 5.1-channel mode being selected, 4-channel audio signals from a 4-channel microphone unit 11 incorporated in the body of the camcorder 3 are supplied to a 5.1-channel synthesizing circuit 12 configured with a DSP (Digital Signal Processor) in the camcorder 3, thereby obtaining 5.1-channel audio signals. Then, the 5.1-channel audio signals from the 5.1-channel synthesizing circuit 12 are supplied to a Dolby Digital 5.1-channel encoder 13.

In the case of the 5.1-channel mode being selected, audio signals from the receiver 4 are added to center audio signals of the 5.1-channel audio signals to be supplied to the Dolby Digital 5.1-channel encoder 13. Then, the signals output from the Dolby Digital 5.1-channel encoder 13 are supplied to the coupling circuit 8 that couples video signals and audio signals.

Further, video signals from the camera 9 are supplied to the coupling circuit 8, and the signals output from the coupling circuit B are recorded into the DVD 10.

Figure 4B:
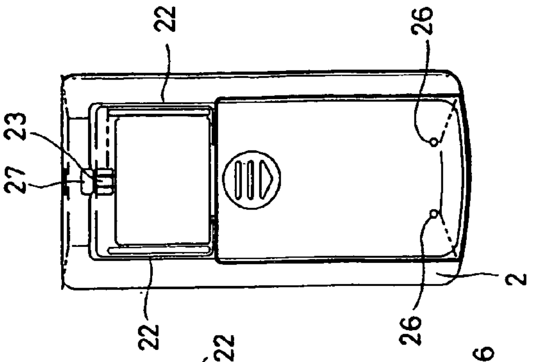
FIGS. 4A through 4F are six diagrams showing an example of a transmitter.
Figure 4F:
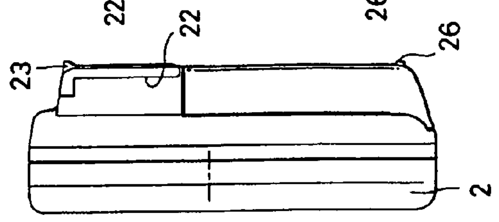
Figure 4C:
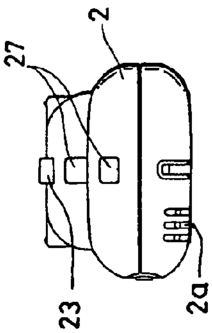
Figure 4A:
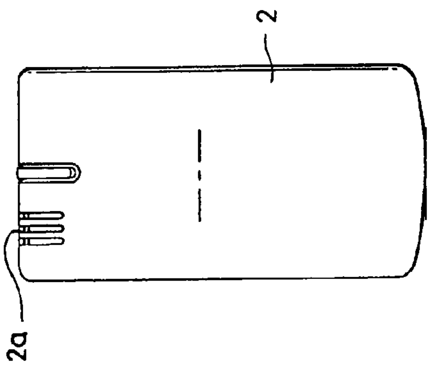
Figure 4D:
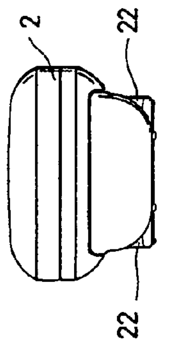
Figure 4E:
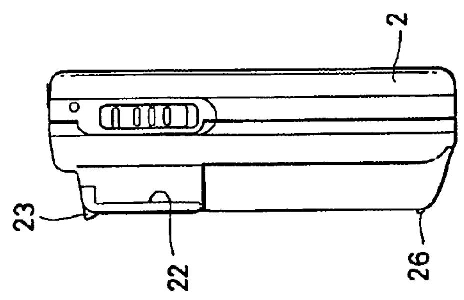

FIGS. 4A through 4F show six diagrams of the transmitter 2 according to the embodiment: FIG. 4A is a front view, FIG. 4B is a rear view, FIG. 4C is a top view, FIG. 4D is a bottom view, FIG. 4E is a left side view, and FIG. 4F is a right side view.

As shown in FIG. 4A in the embodiment, a microphone unit converting collected sounds to audio signals is provided to the inside of the front upper end of the transmitter 2. The microphone unit is provided with vent holes 2*a* as shown in FIGS. 4A and 4C.

Figure 7A:
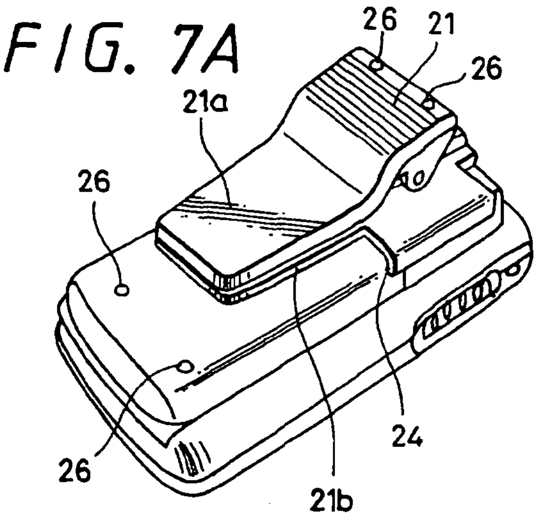
FIGS. 7A and 7B are perspective views showing an example of a state where a clip has been attached to a transmitter.
Figure 7B:
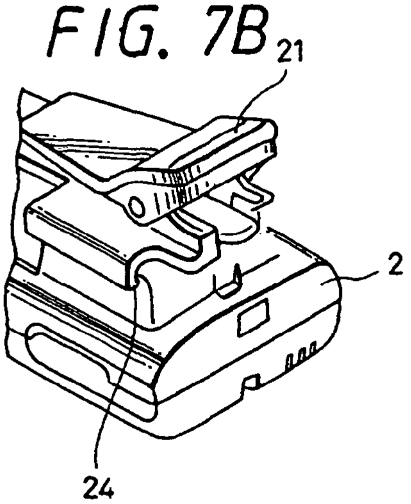

Further, as shown in FIGS. 7A and 7B of this embodiment, a clip 21 is attached in a detachable manner on the rear surface of the transmitter 2, specifically, at the upper end on the rear surface that is opposite surface to the surface on which the microphone unit of the transmitter 2 is attached.

Figure 5:
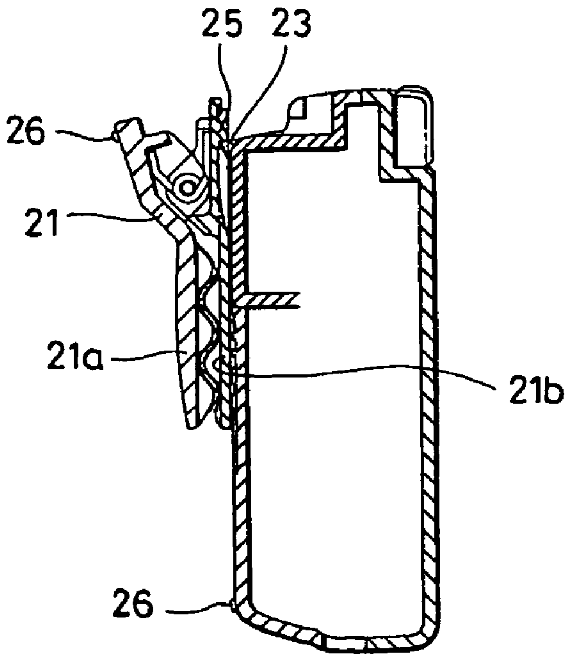
FIG. 5 is a sectional view of an example of a transmitter.
Figure 6:
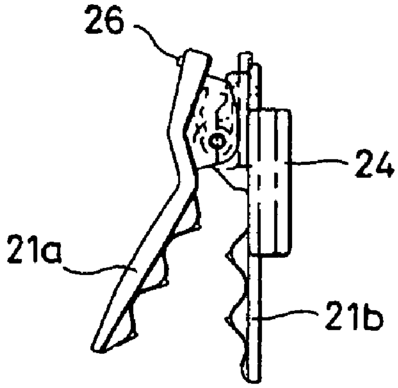
FIG. 6 is a side view of an example of a clip.

As shown in FIGS. 5 and 6, a fixed portion is held with one side 21*a* of the clip 21 and the other side 21*b* thereof by spring force. FIG. 6 shows a state in which one side 21*a* and the other side 21*b* of the clip 21 are opened against the spring force.

In order to attach the clip 21 in a detachable manner to the rear surface of the transmitter 2, for example, two right/left engaging grooves 22, 22 including stopper portions, as shown in FIG. 4D, and a engaging piece 23 including an ascending slope and an engaging portion, as shown in FIGS. 4B and 5, are provided on the rear surface of the transmitter 2. Further, as shown in FIGS. 5, 6 and 7, two right/left engaging projections 24, 24 of a predetermined length held and engaged with the engaging grooves 22, 22 on the rear surface of the transmitter 2 are provided on the surface, which is different from the surface holding the fixed portion, of the other side 21*b* of the clip 21. The engaging projections 24, 24 are engaged with the engaging grooves 22, 22 from below, and are slid upward up to the stopper portions of the engaging grooves 22, 22.

Also, as shown in FIG. 5, an engaging piece 25 engaged with the engaging piece 23, including a descending slope and an engaging portion, is provided at the upper end on the surface, which is different from the surface holding the fixed portion, of the other side 21*b* of the clip 21.

In this embodiment, when attaching the clip 21 to the transmitter 2, the engaging projections 24, 24 provided on the surface, which is different from the surface holding the fixed portion, of the other side 21*b* of the clip 21 are engaged with the engaging grooves 22, 22 on the rear surface of the transmitter 2 from below, and are slid upward up to the stopper portions of the engaging grooves 22, 22. Then, the descending slope of the engaging piece 25 ascends along the ascending slope of the engaging piece 23, and the engaging portions of the engaging pieces 23 and 25 are mutually engaged and fixed.

Also, when detaching the clip 21 from the transmitter 2, the mutually engaged engaging portions of the engaging pieces 23 and 25 are released, and the engaging projections 24, 24 are slid in the engaging grooves 22, 22 in the direction reverse to the above-mentioned direction.

Figure 8:
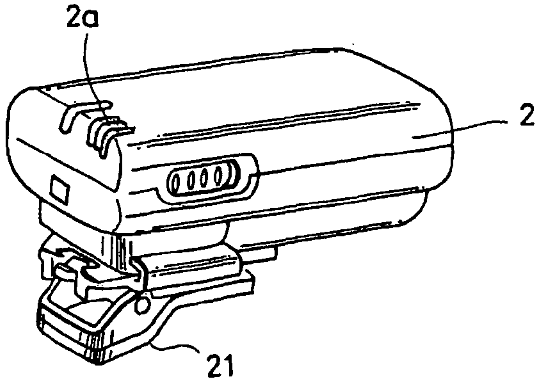
FIG. 8 is a perspective view showing an example of a state where a transmitter has been mounted on a plane.

Mounting protrusions 26 are provided at predetermined positions on the surface, which is different from the surface attached to the transmitter 2, of the clip 21. Specifically, the protrusions are provided on the left and right sides at the upper end on the surface, which is different from the surface holding the fixed portion, of one side 21*a* of the clip 21. Also, the mounting protrusions are provided at predetermined positions on the left and right sides at the lower end on the rear surface of the transmitter 2. Hence, as shown in FIG. 8, the transmitter 2 can be mounted stably on the plane using these mounting protrusions 26.

Figure 9:
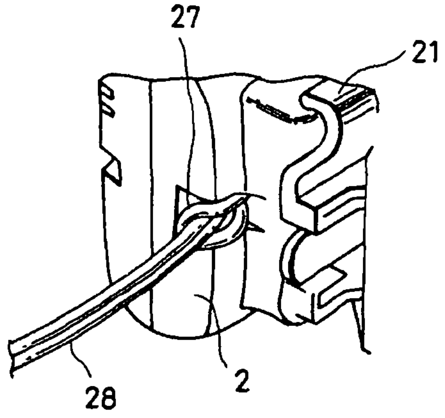
FIG. 9 is a cutaway perspective view showing an example of a state where a strap has been attached to a transmitter.

Further, as shown in FIGS. 4A and 4C, a strap hole 27 is provided in the center of the upper end of a casing of the transmitter 2, and a strap 28 is attached to the strap hole 27, as shown in FIG. 9.

Figure 10:
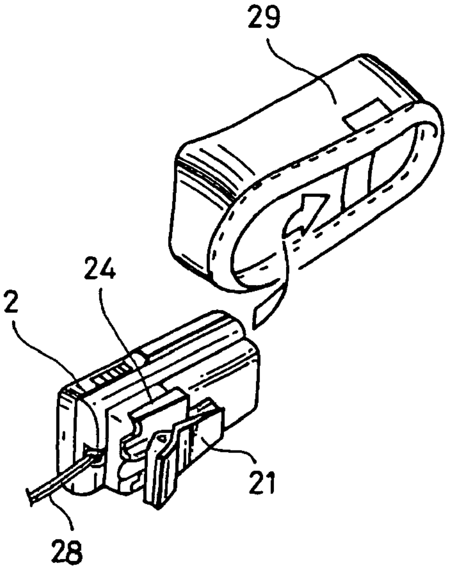
FIG. 10 is a perspective view showing an example in which a wind screen is attached to a transmitter.

Further, as shown in FIG. 10, a wind screen 29 covering the transmitter 2 is provided in this embodiment. In the case of the transmitter 2 being covered with the wind screen 29, noise caused by a strong wind or a person's breath directly applied thereto can be reduced, and also the transmitter 2 can be prevented from being exposed.

Figure 11:
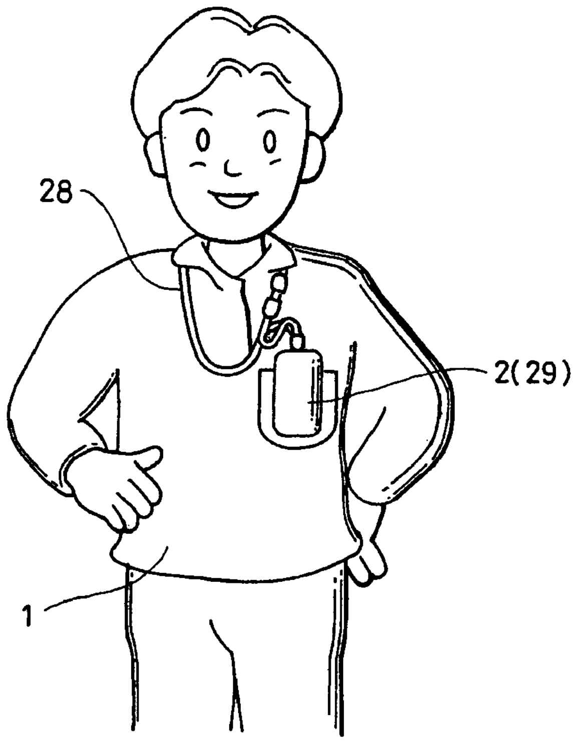
FIG. 11 is a diagram showing an example in which a transmitter has been fixed on an object.

FIG. 11 shows a state in which: the strap 28 is attached to the transmitter 2 according to this embodiment; a person being the object 1 hangs the strap 28 on his/her neck; the transmitter 2 is fixed on his/her pocket by the clip 21 attached to the transmitter 2; and further the transmitter 2 is covered with the wind screen 29.

Figure 12:
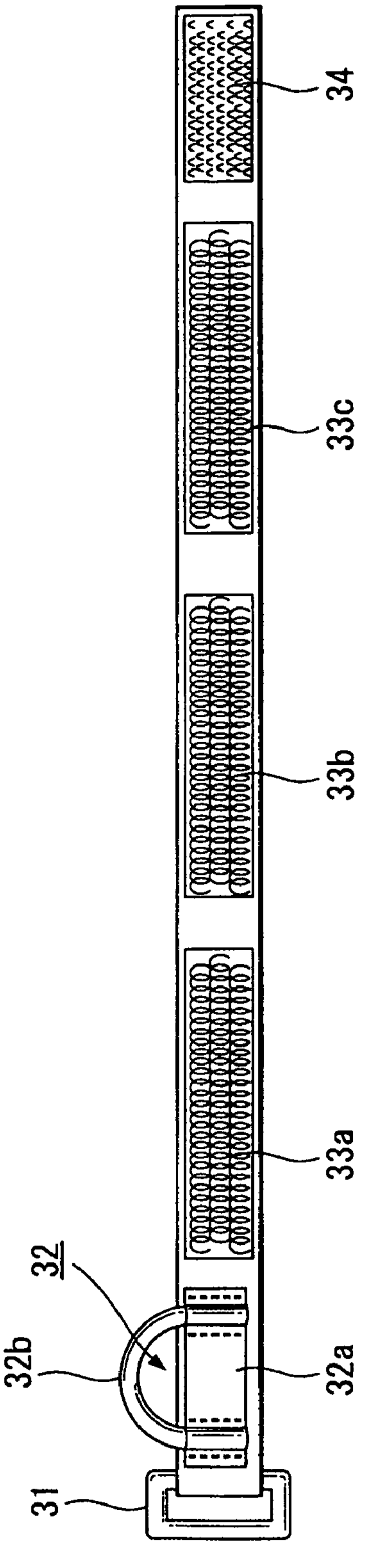
FIG. 12 is a plan view showing an example of a fixing belt.
Figure 15:
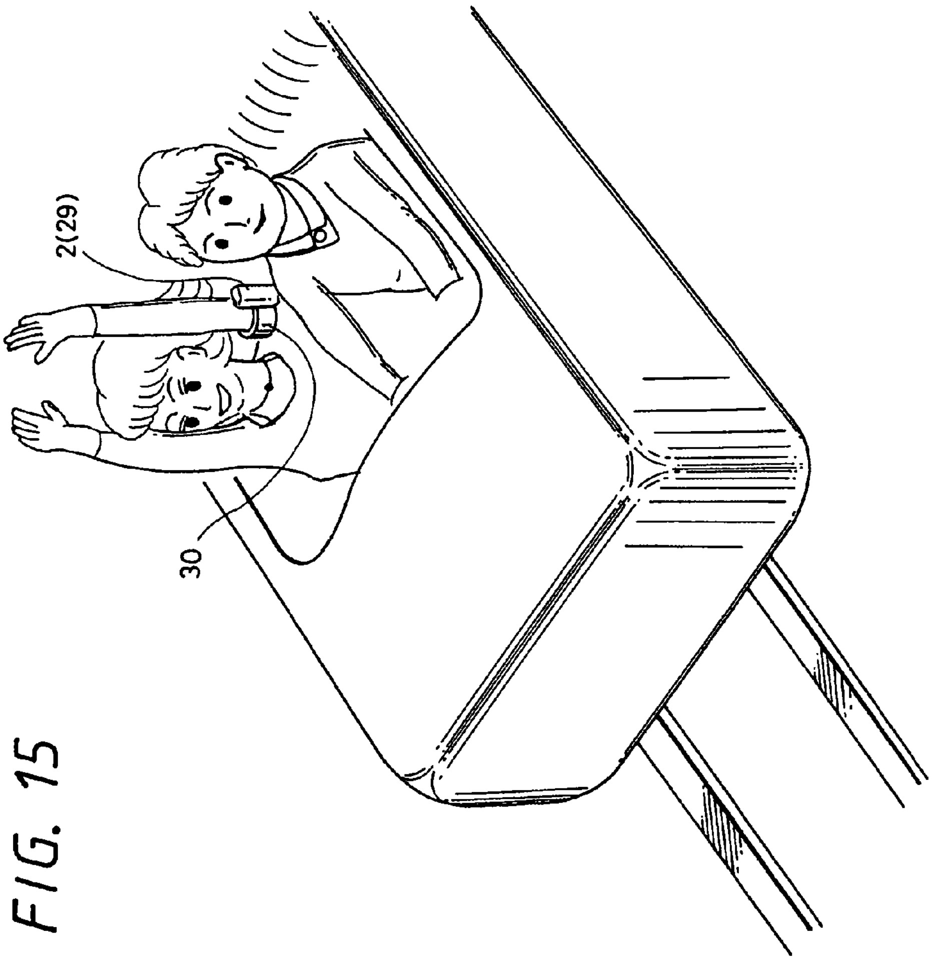
FIG. 15 is a diagram showing an example in which a transmitter has been fixed on an object.

FIG. 12 shows a fixing belt 30 that fixes the transmitter 2 on the arm or the like of a person being the object 1 shown in FIGS. 1 and 15, in the state where the clip 21 is attached to the transmitter 2 according to the embodiment. As shown in FIG. 12, for example, a belt-shaped rubber is used to prepare the fixing belt 30 according to the embodiment, whose width is 2.5 cm and whose length is 40 cm, for example, and a buckle 31 is fixed to one end thereof. A clip attached portion 32 and a plurality of, for example three, engaging surfaces (for example, female surfaces) 33*a*, 33*b*, 33*c* forming one side of hook-and-loop fasteners having a predetermined width and a predetermined length, for example, 2 cm and 9 cm respectively, are fixed in this order from that end toward the other end. Further, an engaging surface (for example, male surface) 34 forming the other side of the hook-and-loop fasteners having a predetermined width and a predetermined length, for example, 2 cm and 3 cm respectively, is fixed to the other end of the belt-shaped rubber.

In this case, portions each having a predetermined length, for example, 1 cm are provided between the engaging surfaces (for example, female surfaces) 33*a*, 33*b*, 33*c* forming one side of the hook-and-loop fasteners, and the belt-shaped rubber is capable of expanding between those surfaces.

As shown in FIG. 12, the clip attached portion 32 of the fixing belt 30 includes a belt-shaped body 32*a* and a string-shaped member 32*b* both of which are fixed. Both ends of the belt-shaped body 32*a* made of a predetermined cloth are locked (sewn), and the belt-shaped body 32*a* is held by the clip 21. The string-shaped member 32*b* is a loop-shaped rubber string or the like provided to the clip attached portion 32 on the side where the clip 21 is inserted. When the clip 21 is attached to the clip attached portion 32, the string-shaped member 32*b* is hooked onto the upper portion of the clip 21, thereby preventing the clip 21 from being detached from the clip attached portion 32.

In this case, the clip attached portion 32 of the fixing belt 30 may be pocket-shaped with a predetermined cloth in which both ends and the opposite side to the clip inserting side are locked, for example, sewn to the fixing belt 30 and are held by the clip 21.

Figure 13:
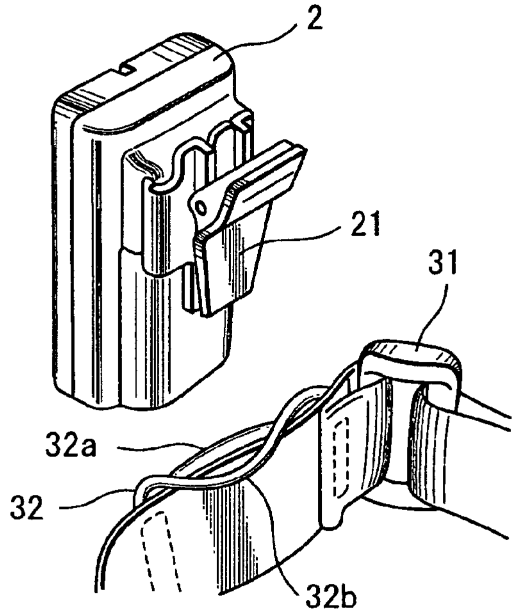
FIG. 13 is a cutaway perspective view showing an example in which a transmitter is attached to a fixing belt.
Figure 14:
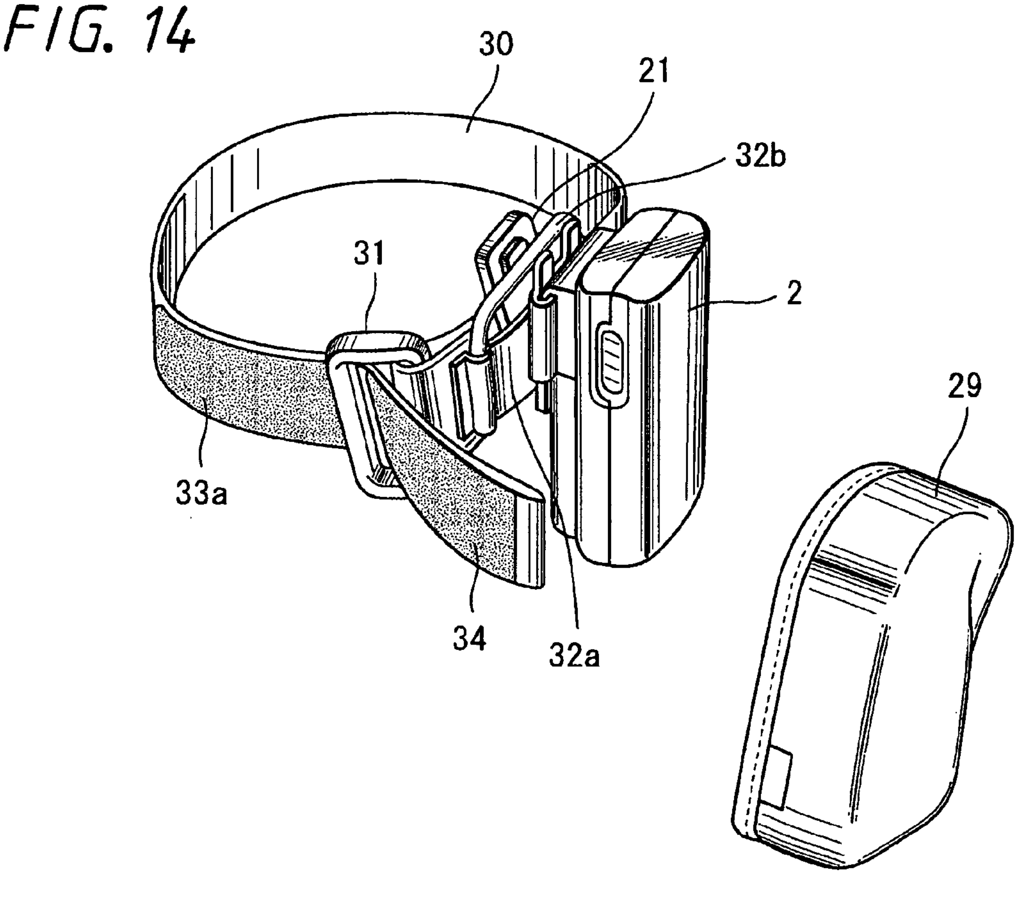
FIG. 14 is a perspective view showing an example of using a fixing belt to which a transmitter has been attached.

In the case of the fixing belt being used, as shown in FIGS. 13 and 14, the clip 21 is attached to the upper portion on the rear surface of the transmitter 2, and the belt-shaped body 32*a* of the clip attached portion 32 of the fixing belt 30 is held by the clip 21 and the string-shaped member 32*b* is hooked onto the upper portion of the clip 21. Then, as shown in FIGS. 1 and 15, the fixing belt 30 is wound around an arm of the person being the object 1 with the hook-and-loop fasteners side facing outside. Subsequently, as shown in FIG. 14, the engaging surface 34 being the other side of the hook-and-loop fasteners at the other end of the fixing belt 30 is passed through the buckle 31 and is pulled in the reverse direction. With the fixing belt being wound suitably, the engaging surface 34 on the other side of the hook-and-loop fasteners is engaged with the engaging surfaces 33*a*, 33*b*, or 33*c* being one side of the hook-and-loop fasteners at a suitable position, and consequently the transmitter 2 is fixed on the arm of the person being the object 1.

In this case, the transmitter 2 may be covered with the wind screen 29, as shown in FIGS. 1 and 15.

In this embodiment, with the structure as described above, in the case of the object 1 riding a roller coaster as shown in FIG. 15, playing soccer or the like, the transmitter 2 is attached to the clip attached portion 32 of the fixing belt 30 in this embodiment by using the clip 21 and is fixed on the arm of the person being the object 1. Therefore, images of the object 1 can be captured with the camcorder 3 and sounds from the object 1 can be recorded clearly.

In the above cases, since the string-shaped member 32*b* is provided to the clip attached portion 32, the clip 21 is prevented from being detached and the transmitter 2 is prevented from slipping off.

Further as shown in FIG. 11, when traveling, the strap 28 may be attached to the transmitter, this strap 28 may be hooked on the neck of a travel attendant and the transmitter 2 may be fixed to a pocket of the travel attendant by the clip 21 attached to the transmitter 2. Then, a photographer can capture images according to his/her wishes, while recording the voice of the attendant.

Further, in the case in which the transmitter 2 is mounted on a predetermined table using the clip 21 by means of the mounting protrusions 26, voices of people enjoying a party or the like can be recorded, while capturing images with the camcorder 3.

It should be understood by those skilled in the art that various modifications, combinations, sub-combinations and alterations may occur depending on design requirements and other factors insofar as they are within the scope of the appended claims or the equivalents thereof.

What is claimed is:

1. A wireless microphone comprising:

a transmitter wirelessly transmitting audio signals converted from sounds collected with a microphone unit, the microphone unit being provided inside of an upper portion of said transmitter and attached on an inner surface of said transmitter, an engaging groove being provided on an outer surface of said transmitter; and a receiver receiving said audio signals, wherein a clip is detachably attached to said transmitter by engaging with at least one engaging groove, and wherein the transmitter is configured to be attached to a fixing belt using the clip, the fixing belt having a string-shaped member configured to be hooked onto an upper portion of the clip to prevent the clip from being detached.

2. A wireless microphone according to claim 1, wherein said clip is detachable from said transmitter by disengaging with the at least one engaging groove.

3. A wireless microphone according to claim 1, wherein the at least one engaging groove comprises at least one stopper portion, and said clip is engaged with the at least one engaging groove by sliding up to the at least one stopper portion.

4. A wireless microphone according to claim 1, wherein a strap hole is provided at one end of a casing of said transmitter; and a strap is attached to said strap hole.

5. An apparatus for fixing a transmitter of a wireless microphone including a transmitter wirelessly transmitting audio signals converted from sounds collected with a microphone unit and a receiver receiving said audio signals, the microphone unit being provided inside of an upper portion of said transmitter and attached on an inner surface of said transmitter, an engaging portion being provided on an outer surface of said transmitter, wherein:

a clip is detachably attached to said transmitter by engaging with the engaging groove and said transmitter is capable of being mounted on a plane using the clip; and said clip is attached to a clip attached portion of a fixing belt using said clip; and a string-shaped member configured to be hooked onto an upper portion of the clip to prevent the clip from being detached is provided on the clip attached portion of the fixing belt.

6. An apparatus for fixing a transmitter of a wireless microphone according to claim 5, wherein said clip attached portion of said fixing belt is a belt-shaped body whose both ends are locked to the fixing belt or a pocket-shaped body in which both ends and an opposite side to a clip inserting side are locked thereto.

7. An apparatus for fixing a transmitter of a wireless microphone according to claim 5, wherein a belt portion of said fixing belt includes a plurality of hook-and-loop fasteners, and portions between said plurality of hook-and-loop fasteners are at least made of an elastic member.

8. An apparatus for fixing a transmitter of a wireless microphone according to claim 5, wherein said fixing belt includes:

a buckle fixed at one end, the clip attached portion being fixed next to the buckle;

engaging surfaces forming one side of a plurality of hook-and-loop fasteners fixed next to the clip attached portion; and an engaging surface forming the other side of said hook-and-loop fasteners fixed at the other end of said fixing belt.

9. A wireless microphone according to claim 3, further comprising two engaging projections provided on a surface of the clip, wherein the at least one engaging groove comprises two engaging grooves, the two engaging projections causing the clip to be engaged with the two engaging grooves.

10. A wireless microphone according to claim 9, wherein the at least one stopper portion comprises two stopper portions.

11. A wireless microphone according to claim 1, further comprising a first engaging piece disposed on a rear surface of the transmitter and a second engaging piece disposed on the clip, the first engaging piece including an ascending slope and a first engaging portion, the second engaging piece including a descending slope and a second engaging portion, wherein the descending slope of the second engaging piece is configured to ascend along the ascending slope of the first engaging piece, and wherein the first engaging portion and the second engaging portion are configured to be fixedly engaged with one another.

12. An apparatus for fixing a transmitter of a wireless microphone according to claim 6, wherein the clip attached portion of said fixing belt is the belt-shaped body whose both ends are locked to the fixing belt.

13. An apparatus for fixing a transmitter of a wireless microphone according to claim 6, wherein the clip attached portion of said fixing belt is the pocket-shaped body, the pocket shaped body comprising a cloth, wherein both ends and the opposite side to the clip inserting side of the pocket shaped body are sewn to the fixing belt.

14. A wireless microphone according to claim 4, wherein the strap hole is provided at the upper portion of the casing of the transmitter, the strap being configured to hang around a neck of a user of the wireless microphone.

15. A wireless microphone according to claim 1, further comprising a wind screen covering the transmitter, the wind screen being configured to reduce noise caused by wind.

16. An apparatus for fixing a transmitter of a wireless microphone according to claim 5, further comprising a wind screen covering the transmitter, the wind screen being configured to reduce noise caused by wind.

17. A wireless microphone according to claim 1, wherein the receiver is attached to a camcorder, the receiver including an antenna positioned in a direction corresponding with a direction of a light axis of the camcorder.

18. An apparatus for fixing a transmitter of a wireless microphone according to claim 5, wherein the receiver is attached to a camcorder, the receiver including an antenna positioned in a direction corresponding with a direction of a light axis of the camcorder.

* * * * *